Aug. 13, 1968  C. RYZNER  3,396,633
HYDRAULIC VARIABLE TORQUE MOTOR
Filed Jan. 23, 1967
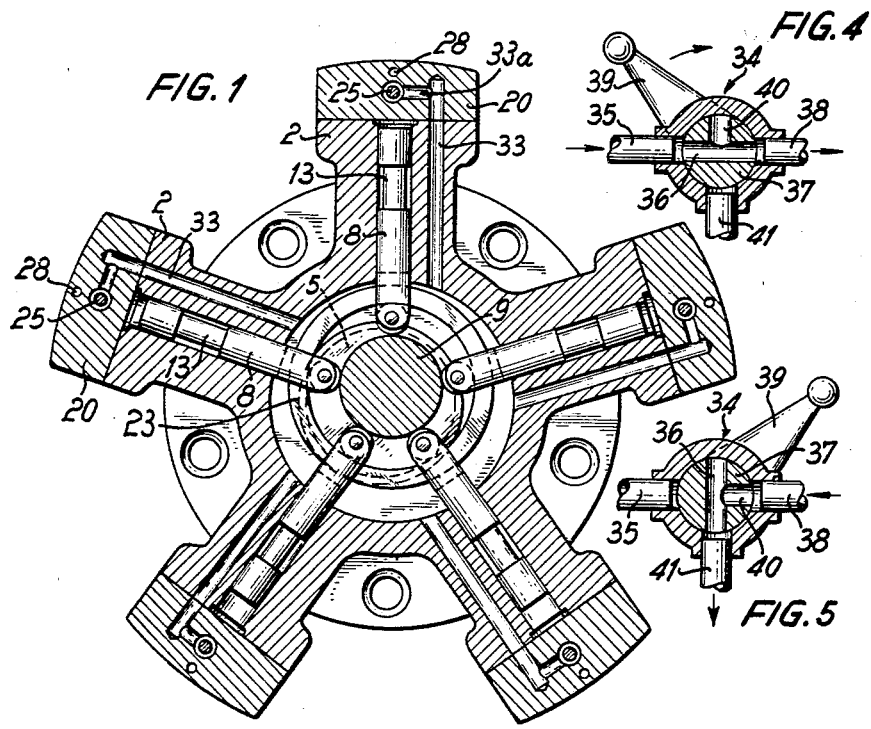
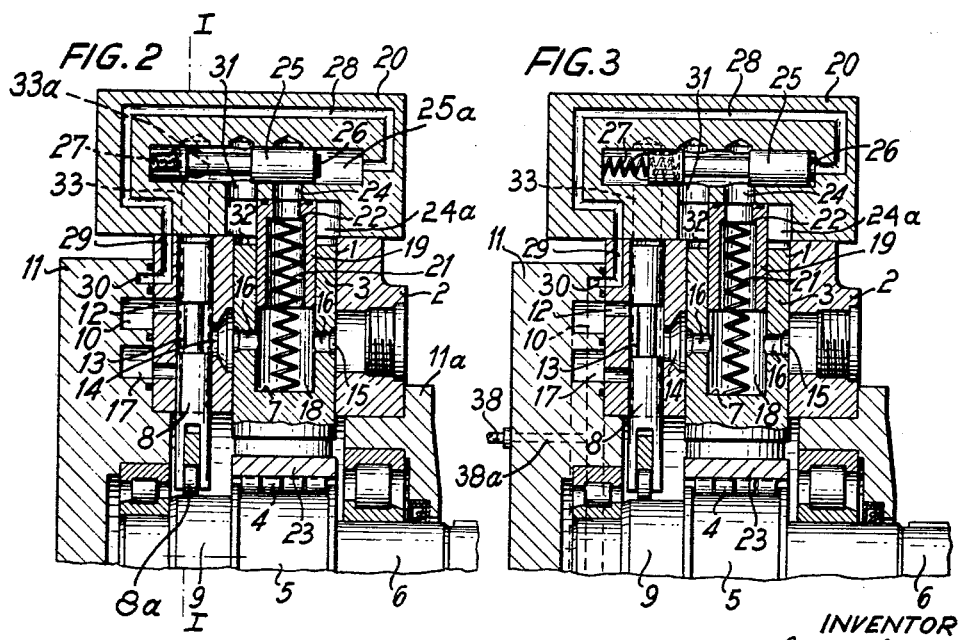
INVENTOR
Clemens Ryzner
by
Michael J. Striker
Attorney 3,396,633
HYDRAULIC VARIABLE TORQUE MOTOR
Clemens Ryzner, Sprockhovel, Germany, assignor to Paul
Pleiger Maschinenfabrik, Hammerthal, Germany
Filed Jan. 23, 1967, Ser. No. 611,121
Claims priority, application Germany, Jan. 26, 1966,
38,625
10 Claims. (Cl. 91—202)

ABSTRACT OF THE DISCLOSURE

The area of the pressure surfaces of the pistons of the hydraulic motor propelling a vehicle, is changed for providing a greater torque for the vehicle on rough grounds than on roads.

Background of the invention

The present invention relates to a hydraulic variable torque motor of the radial piston type, which is particularly suitable for the operation of vehicles either on smooth road surfaces or on rough grounds. Vehicles serving this purpose operate at a lower speed on rough grounds than on roads, and require a greater torque on rough grounds than on roads.

In accordance with the prior art, a shiftable transmission is provided between the hydraulic motor and the drive shaft of the vehicle, but such an arrangement requires space and is expensive.

Another construction of the prior art varies either the amount of fluid pumped by a pump into the hydraulic drive motor, and/or varies the volume of fluid sucked into the hydraulic motor. This is accomplished by adjusting the stroke of the pump pistons and/or the stroke of the pistons of the hydraulic drive motor. A variation of the stroke of pump pistons does not obtain, during operation of the vehicle at low speed on rough grounds, also a correspondingly greater drive torque for the vehicle than during operation of the same on a road at higher speed. If the stroke of the pistons of the hydraulic drive motor of the vehicle is varied, the hydraulic drive motor operates at a high torque and low rotary speeds on rough grounds if a long stroke is adjusted. However, if the stroke of the hydraulic drive motor is reduced for the purpose of increasing the rotary speed of the motor when the vehicle operates on a road, the output torque is correspondingly decreased but at the same time the efficiency of the hydraulic drive motor is reduced due to the increase of the inner friction. Since the increase of the friction caused by a reduction of the stroke should not reach values causing a jamming of the hydraulic drive motor, the range within which the piston stroke of the same can be adjusted is limited. As a result, the rotary speed of the hydraulic drive motor cannot be varied within the desired wider range required by operation on a road and on rough grounds. Another disadvantage is that adjustable stroke piston pumps and hydraulic motors are comparatively large and expensive.

Summary of the invention

It is one object of the invention to provide a hydraulic variable torque motor which is settable between two conditions operating at high torque and low rotary speed or at a low torque and high rotary speed, while high efficiency is maintained at the high rotary speed.

Another object of the invention is to provide a hydraulic variable torque motor which is operable at the same high efficiency at substantially different rotary speeds.

It is another object of the invention to drive by such a hydraulic variable torque motor, a vehicle on a road at high speeds and low torque and on a rough ground at low speed and high torque.

With these objects in view, one embodiment of the invention comprises cylinder means mounted on the vehicle; piston means in said cylinder means and having first and second pressure surfaces forming with said cylinder means first and second cylinder chambers; drive means connecting the piston means with the vehicle for operating the same; a source of fluid; and control means operable between said first and second positions for selectively guiding pressure fluid either only into the first cylinder chamber, or into both the first and second cylinder chambers.

In the first position of the control means, which is preferably a control valve means, pressure is exerted only on the first pressure surface of each piston, and in the second position pressure is exerted on both pressure surfaces of each piston. In the first position of the control means the output torque of the hydraulic motor is smaller and the vehicle can be operated on a road at high speed. In the second position of the control means, the torque is greater and the vehicle can be driven on rough grounds at a lower speed.

When the hydraulic motor is operated at high speed, and the area of the operative pressure surfaces is small, the axial pressure acting on the pistons is reduced. The transmission of the axial piston force to the drive means which transforms the piston stroke into a rotary movement, takes place on an unchanged surface at high speed operation as well as at low speed operation of the motor. Since at the high speed operation, the axial force of the pistons is reduced, correspondingly reduced friction occurs at the force transmitting surfaces of the drive means. Consequently an increase of the efficiency takes place at high speed operation of the hydraulic motor.

The source of fluid is a pump providing a pressure fluid to the cylinder means of the hydraulic motor and exhausting fluid from the same. The pump may either have a constant output volume of pressure fluid, or a variable output of pressure fluid which may be used for a further variation of the rotary speeds of hydraulic motors. If a pump having a variable output volume is used, the number of pressure surfaces of the pistons of the hydraulic motor can be smaller without causing an undesired reduction of the possible range of vehicle speeds.

The number of the pressure surfaces on the motor pistons and the area of the same, depend on the rotary speed and output torque of the hydraulic drive motor required by the speeds of the vehicle desired on roads and on rough grounds. As a rule, it is advantageous to provide first and second pressure surfaces having different areas on the motor piston means.

In the event that only two pressure surfaces are required for each motor piston, the present invention preferably provides pot-shaped open motor pistons whose cylindrical wall has ducts for supply and discharge of the working fluid, while a tubular member projects into the cavity of the motor piston. The pressure fluid flows through the tubular member into the cavity of the piston so that the bottom of the cavity forms a first pressure surface. An annular rim of the pot-shaped piston forms a second annular pressure surface surrounding the tubular cylinder member. Control valve means are operable between two positions for supplying the pressure fluid either only into the cavity of the piston, or also to the annular pressure surface along the rim of the same so that the axial fluid pressure acting on the piston is increased, and the same acts with a greater axial force on an eccentric portion of the drive shaft by which the vehicle is driven. The control valve is spring-biased to move to one position, and is shifted to the other position by pressure fluid under the control of an operating valve.

It is advantageous that the tubular member is slidable within the cavity of the piston, and is urged by a spring in the cavity to abut a face of the cylinder head so that the tubular member is movable relative to the cylinder head to assure a fluid-tight seal between the sliding surfaces of the tubular member and the piston. The springs urge the motor pistons against the eccentric portion of a drive shaft if no fluid pressure acts on the motor pistons. Preferably, a ring and rollers are provided between the inner ends of the pistons and the eccentric portions of a drive shaft to reduce the friction.

In the preferred embodiment of the invention, a reciprocable valve is mounted in a valve chamber for movement parallel to the piston movement and controls the flow of pressure fluid into the cylinder chambers, and the exhaust of fluid from the same. The control valve means by which the hydraulic motor is set to high speed or low speed operation, respectively, are preferably located in a removable cylinder head and operable in a direction transverse to the reciprocating movement of the motor piston means.

It is advantageous to supply and discharge the pressure fluid through annular pressure and suction ducts in a removable part of the cylinder means communicating with conduits in the same which are connected through the above-mentioned valve chamber with the cavities of the motor pistons.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

*Brief description of the drawing*

FIG. 1 is a cross-sectional view illustrating a hydraulic motor according to one embodiment of the invention taken on line I—I in FIG. 2;

FIG. 2 is an axial sectional view of the embodiment of FIG. 1 in an operational condition suitable for operation of a vehicle on a road;

FIG. 3 is an axial sectional view corresponding to FIG. 2 but illustrating the embodiment in another operational condition suitable for operation of the vehicle on rough grounds;

FIG. 4 is a fragmentary cross-sectional view illustrating an operating valve in a first operational position for setting the hydraulic motor to the condition shown in FIG. 2; and FIG. 5 is a fragmentary sectional view illustrating the operating valve of FIG. 4 in a position for obtaining the operational position of the motor shown in FIG. 3.

*Description of a preferred embodiment*

Cylinder means 2 have five radially extending cylinder bores 1 in which pistons 3 are mounted for sliding movement between inner and outer positions. The inner ends of pistons 3 abut a ring 23 which is supported by rollers 4 on an eccentric portion 5 of a drive shaft 6 from which the propulsion means of a vehicle, not shown, are driven. When pistons 3 are moved inwardly by pressure fluid as will be explained hereinafter, the radial forces exerted by the pistons on the eccentric portion 5 cause rotation of drive shaft 6.

The cylinder means include a main body, a lateral flange 11 supporting a bearing for the end portion of shaft 6, another member 11a supporting another bearing for shaft 6, and a cylinder head 20, which is detachable from the main cylinder body.

A source of fluid, such as a pump, not shown, supplies pressure fluid through a duct into an annular pressure duct 10 in flange 11, while the fluid is exhausted by the pump through a duct connected with annular suction duct 17. Ducts 10 and 17 are circular and concentric with the axis of shaft 6.

The pressure fluid flows from annular pressure duct 10 through a conduit 12 in the cylinder body into a valve chamber in which a slide valve 8 is mounted for reciprocation. Slide valve 8 has a restricted portion 13 forming an annular space which communicates in the illustrated position of slide valve 8 with conduit 12. The annular space communicates with a conduit portion 14 communicating with a peripheral groove 15 of piston 3 which is connected via ducts 16 with a cavity 18 in the respective piston 3. The pressure fluid acts on the bottom of the cavity 18 and urges the piston inward toward the axis of shaft 6. After moving the piston inwards, the pressure fluid flows through conduit 16 and 14 into the annular space surrounding valve portion 13 which communicates through another duct with the annular suction duct 17 in a shifted position of slide valve 8.

Slide valve 8 is reciprocated in synchronism with the movements of the pistons by a cam follower portion having a cam follower roller 8a engaging another eccentric portion 9 of drive shaft 6.

In this manner, the cavity 18 of each piston 3 is alternately filled with high pressure and low pressure fluid and the high pressure fluid exerts pressure on the bottom 7 which constitutes a first pressure surface of the piston.

Tubular members 19 are respectively located in the cavities 18 of pistons 3 and have outer cylindrical surfaces in sliding and sealing contact with cylindrical inner surfaces of the pistons. Springs 21 are located in the cavities 18 of the pistons and abut the bottoms 7 and annular shoulders 22 on inner flanges on the outer ends of tubular members 19 so that the same are urged to move out of the cavities of the pistons. The end faces of tubular members 19 abut in sealing contact against corresponding surfaces of cylinder heads 20 which are respectively detachably attached to the main cylinder body 2. Springs 21 also perform the function of urging pistons 3 inwardly against ring 23 when cavities 18 are not filled with pressure fluid.

Cavities 18 communicate through the interiors of the respective tubular members 19 with first cylinder chambers 24 in the cylinder heads 20. Each piston 3 has a rim 32 forming a second circular or annular pressure surface surrounding the respective tubular member 19. The rims 32 are respectively located in circular second cylinder chambers 24a.

A control valve means 25 is located in each cylinder head 20 in a corresponding valve chamber and is urged by a spring 27 abutting the bottom of the valve chamber to move to the right as viewed in the drawing from the position of FIG. 2 to the position of FIG. 3. The other end of each valve chamber 25a is connected by a conduit 28 in cylinder head 20 to a conduit 29 in cylinder body 2 which communicates with an annular duct 30 in flange portion 11. The annular duct 30 is connected by duct 38a to a conduit means 38, as shown in FIG. 3. Conduit means 38 is connected to an operating valve 34 which has a first position shown in FIG. 4 in which pressure fluid supplied through a conduit 35 is connected by a valve duct 36 to conduit 38. When the handle 39 is shifted from the position of FIG. 4 to the position of FIG. 5, the valve conduit 36 is connected with a discharge conduit 41, and connects conduit 38 to the same.

In the position of FIG. 4, pressure fluid is supplied through duct 38, 38a, annular duct 30, and conduit 28, into the right end of valve chamber 25a so that the force of spring 27 is overcome and control valve 25 is placed in the position shown in FIG. 2. In this position, control valve 25 closes the first cylinder chamber 24 which communicates with cavity 18 and connects the second cylinder chamber 24a by a duct 31 with a portion of valve chamber 25a in which a reduced portion of the control valve 25 is located, so that the second cylinder chamber 24a communicates through a duct portion 33a with a duct 33 which is connected to a low pressure space of the motor.

Consequently, no pressure is exerted in the position of FIG. 2 on rim 32.

When operating valve 5 is turned to the position of FIG. 5, the pressure is reduced in annular duct 30, conduit 29 and 28, and in the right end portion of control valve chamber 25a. Spring 27 moves control valve 25 to the position of FIG. 3 so that the annular space in the valve chamber 25a surrounding the reduced portion of control valve 25 connects the first cylinder chamber 24 of each cylinder head 20 with the second annular cylinder chamber 24a through conduit 31.

The pressure fluid supplied from the pump, not shown, into the annular pressure duct 10 and flowing through the chamber of slide valve 8 into cavity 18 of each piston, can flow in the position of FIG. 3 from the first cylinder chamber 24, through the annular space in valve chamber 25a and conduit 31 into the annular second cylinder space 24a where it exerts pressure on the second pressure surface of the respective piston 3, formed by rim 32. Therefore, in the position of FIG. 3, the pressure fluid will act on the first and second pressure surfaces of each piston 3, namely on the bottom 7 and on the rim 32, so that the pistons are urged inwardly at a greater force in the position of FIG. 3 than in the position of FIG. 2, where the pressure acts only on the first pressure surface formed by the bottom 7 of each piston. In the operational condition of FIG. 3, a portion of control valve 25 separates conduit 31 and the second cylinder chamber 24a from low pressure conduits 33a and 33.

Since in the operational condition shown in FIG. 3, cylinder chamber 24a has to be filled by pressure fluid supplied by the pump, not shown, pistons 7 will move slower towards shaft 6 than in the operational condition of FIG. 2, in which only the cylinder chamber formed by the expanding cavity 18 has to be filled. Consequently the rotary speed of drive shaft 6 is smaller in the operational condition of FIG. 3 than in the operational condition of FIG. 2. At the same time, due to the greater pressure exerted on the two pressure surfaces 31 and 7, in the condition of FIG. 3, the output torque of shaft 6 is increased as compared with the operational condition of FIG. 2.

When the vehicle is operated on a road, the operator turns handle 39 of valve 34 to the position of FIG. 4 so that pressure fluid shifts control valve 25 to the position of FIG. 2, and the drive shaft 6 is rotated at high speed and comparatively low torque for propelling the vehicle on the road. On rough grounds, the operator turns handle 39 to the position of FIG. 5 so that the force of spring 27 is sufficient to shift control valve 25 to the position of FIG. 3, whereby the drive shaft 6 is operated at a lesser speed and produces a greater output torque for operating the vehicle on rough grounds.

The pistons of the illustrated embodiment have two pressure surfaces 7 and 32. However, it is also possible to provide pistons with a greater number of pressure surfaces and to subject such pressure surfaces singly or in groups to high pressure for producing different torques. In such a construction, the control valve is modified to operate between a corresponding number of positions.

It is advantageous to mount the control valves in detachable cylinder heads, which may be removed and replaced with standard cylinder heads in the event that a torque variation of the hydraulic motor is not desired. Tubular members 19 are also removed, and the substituted cylinder head has a cylinder chamber in which pressure fluid acts on rings 32 and bottom 7 of each piston at all times. In the illustrated embodiment, each tubular member 19 centers itself in the cylindrical cavity 18 of the respective piston since the outer free end of the tubular member is slidable on a corresponding surface of the cylinder head 20. Cylinder chamber 24 communicates through the interior of tubular member 19 with cavity 18, the latter may be considered as part of cylinder chamber 24.

It will be understood that each of the elements described above, or two or more together may also find a useful application in other types of hydraulic variable torque motors differing from the types described above.

While the invention has been illustrated and described as embodied in a hydraulic motor settable between at least two operational conditions producing different torques at different rotary speeds for driving a vehicle on roads or on rough grounds, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Hydraulic variable torque motor for a vehicle which is selectively operable on roads and on rough grounds, comprising, in combination, cylinder means mounted on said vehicle; piston means in said cylinder means and having first and second pressure surfaces forming with said cylinder means first and second cylinder chambers; drive means connecting said piston means with said vehicle so that operation of said piston means causes movement of said vehicle; means for supplying a pressure fluid to said cylinder means and for exhausting the fluid from the same; and control means operable at least between first and second positions for selectively guiding pressure fluid only into said first cylinder chamber, and into said first and second cylinder chambers so that in said first position pressure is exerted on said first pressure surface only and in said second position pressure is exerted on both said first and second pressure surfaces whereby in said first position said vehicle can be driven on a road at a lower torque and at a higher speed, while in said second position said vehicle can be driven on rough-ground at a higher torque and at a lower speed.

2. Hydraulic motor as defined in claim 1 wherein said first and second pressure surfaces of said piston means have different areas.

3. Hydraulic motor as defined in claim 1 wherein said piston means include a piston having a cavity with a bottom forming one of said pressure surfaces, and having an annular rim surrounding said cavity and forming the other of said pressure surfaces; and wherein said cylinder means includes a member located in said cavity and separating said first and second cylinder chambers, and said first and second pressure surfaces from each other while permitting reciprocation of said piston.

4. Hydraulic motor as defined in claim 3, wherein said piston has a cylindrical wall bounding said cavity and having said rim; and wherein said member is tubular and has an outer diameter matching the inner diameter of said cylindrical wall of said cavity so that the inner surface of said wall slides fluidtight on the outer surface of said cylinder member, the interior of said tubular cylinder member connecting said first cylinder chamber with said cavity so that said bottom forms said first pressure surface, and said rim forms said second pressure surface.

5. Hydraulic motor as defined in claim 4 wherein said first cylinder chamber is located at the end of and within said tubular member communicating with said cavity, and wherein said second cylinder chamber is annular and located outside of said tubular member partly bounded by said second pressure surface.

6. Hydraulic motor as defined in claim 3 wherein said cylinder means has a valve chamber; wherein said control means comprise control valve means in said valve chamber movable between said first and second positions, and including a spring in said valve chamber biassing said control valve means into one of said positions, said cylinder means having a pressure conduit connected with said valve chamber so that pressure fluid admitted into said valve chamber moves said control valve means to the respective other position.

7. Hydraulic motor as defined in claim 3 wherein said cylinder means include a main cylinder body in which said piston means is mounted for reciprocating movement, and a cylinder head in which at least part of said first and second cylinder chambers are located; and wherein said control means include control valve means mounted in said cylinder head.

8. Hydraulic motor as defined in claim 7 and comprising a spring located in said cavity of said piston and having ends respectively abutting said bottom and said member for urging said member against said cylinder head for forming a fluid tight sealing contact separating said first and second cylinder chambers.

9. Hydraulic motor as defined in claim 7 wherein said cylinder body has a cylinder bore in which said piston is mounted for reciprocation and a valve chamber having an axis parallel with the axis of said cylinder bore, annular pressure and suction ducts communicating with said means for supplying pressure fluid, and with said valve chamber, and conduits connecting said valve chamber with said cylinder bore; and wherein said piston has ducts connecting said conduits with said cavity in said piston; and comprising a reciprocable slide valve in said valve chamber controlling the supply and discharge of fluid into said cavity through said ducts and conduits so that pressure is exerted on said bottom of said cavity of said piston; and wherein said drive means include a shaft having a first eccentric portion engaged by said piston means so that said shaft is rotated, and a second eccentric portion for reciprocating said slide valve.

10. Hydraulic motor as defined in claim 1 wherein said cylinder means has valve chamber means and conduit means connected to the same; wherein said control means comprise control valve means located in said valve chamber means movable between said first and second positions; and comprising operating valve means located in said conduit means and being manually operable for supplying pressure fluid through said conduit means into said valve chamber means for shifting said control valve means between said positions thereof.

References Cited

UNITED STATES PATENTS

| | | | |
|---|---|---|---|
| 1,229,076 | 6/1917 | Hayes | 60—53 |
| 2,370,526 | 2/1945 | Doran | 60—53 |
| 2,374,588 | 4/1945 | Doran | 60—53 |
| 3,057,161 | 10/1962 | Henke et al. | 60—97 XR |
| 3,206,931 | 9/1965 | Wilson | 60—53 |

EDGAR W. GEOGHEGAN, *Primary Examiner.*